(12) United States Patent
Shih

(10) Patent No.: US 6,591,859 B2
(45) Date of Patent: Jul. 15, 2003

(54) BALL VALVE

(76) Inventor: Ming-Hsiu Shih, No. 12, Lane Jih Hsin, Ma Hsing Village, Hsiu-Shui Hsiang, Changhua (TW)

( * ) Notice: Subject to any disclaimer, the term of this patent is extended or adjusted under 35 U.S.C. 154(b) by 0 days.

(21) Appl. No.: 10/014,542

(22) Filed: Dec. 14, 2001

(65) Prior Publication Data

US 2003/0111113 A1 Jun. 19, 2003

(51) Int. Cl.[7] .............................................. F16K 51/00
(52) U.S. Cl. .............. 137/375; 251/315.05; 251/315.16
(58) Field of Search ......................... 137/375; 251/304, 251/315.01, 315.03, 315.05, 315.16

(56) References Cited

U.S. PATENT DOCUMENTS 3,749,021 A * 7/1973 Burgess ..................... 102/43 P
3,961,770 A * 6/1976 Wrasman ..................... 251/315
5,593,136 A * 1/1997 Reed et al. .................. 251/366

* cited by examiner

Primary Examiner—Kevin Lee
(74) Attorney, Agent, or Firm—Bacon & Thomas, PLLC

(57) ABSTRACT

A plastic ball valve has a layer of metal film coated on the ball by electroplating. This prevents the ball from directly contacting the inner surface of a pipe housing socket. Microorganisms are prevented from growing at the junction of the ball and pipe housing. When the pipe housing is sleeved on another pipe by applying an adhesive, any adhesive that adheres on the ball is easily peeled off during valve operation. This ensures a smooth regulation of fluid flow through the pipe housing.

2 Claims, 5 Drawing Sheets

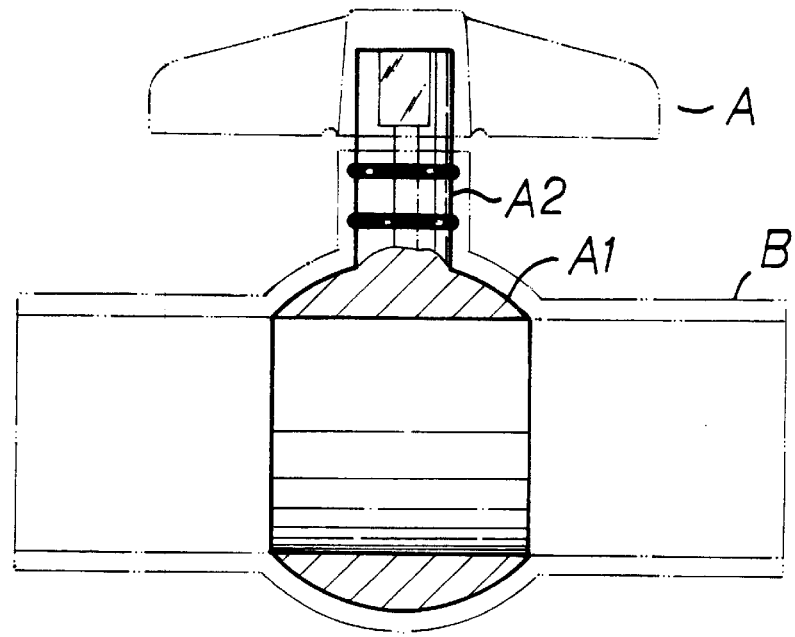
FIG. 1-A
PRIOR ART
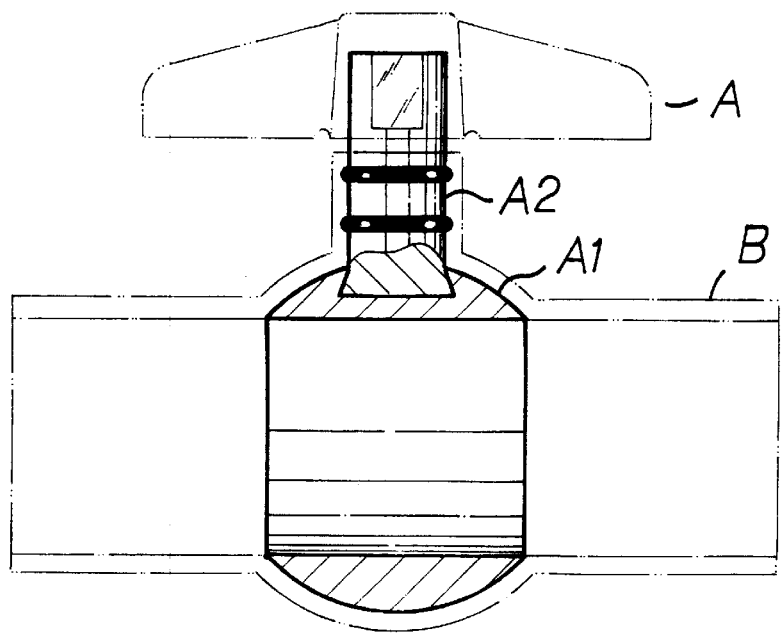
FIG. 1-B
PRIOR ART

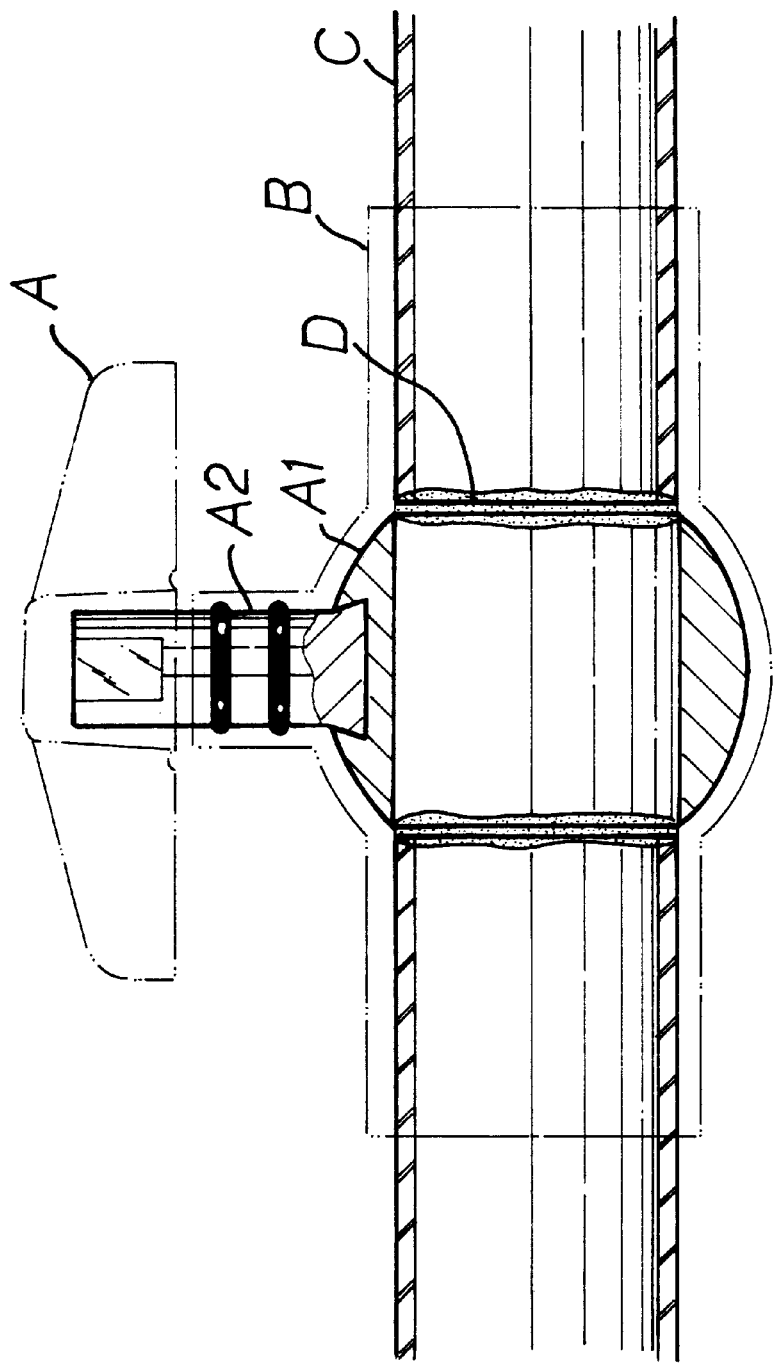
FIG.1-C
PRIOR ART

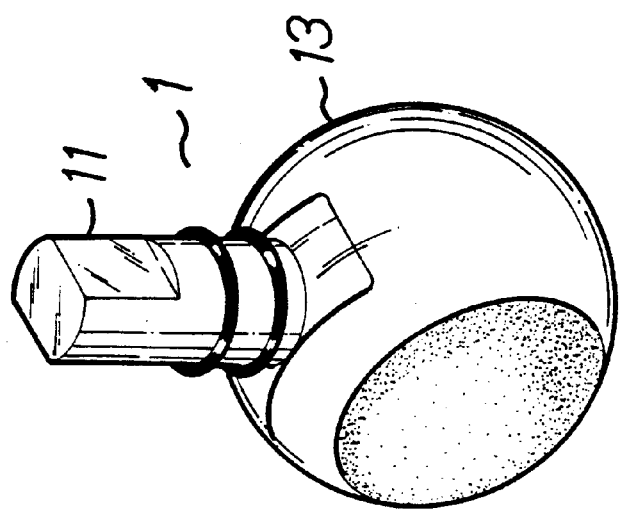
FIG.2-B
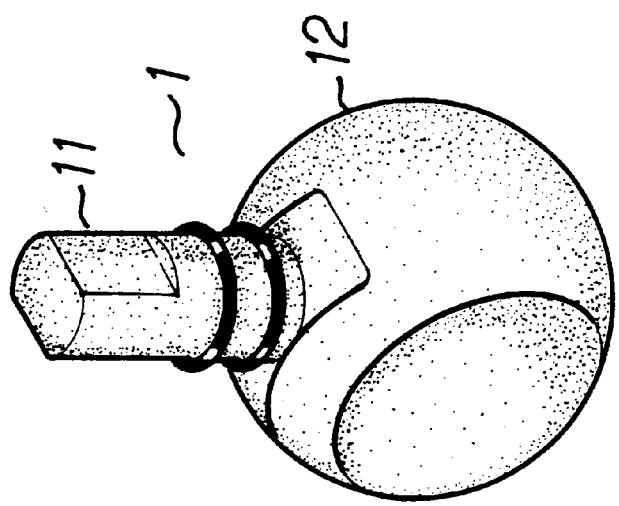
FIG.2-A
PRIOR ART

BALL VALVE

FIELD OF THE INVENTION

The present invention relates to valves and more particularly to a ball valve with improved characteristics.

BACKGROUND OF THE INVENTION

A conventional ball valve A is shown in FIGS. 1A and 1B. The ball valve A comprises a ball A1 and a stem A2 extended vertically from ball A1 both formed of plastic material. Further, both ball A1 and stem A2 are integrally formed or separately manufactured connectable components. Finally, ball valve A is mounted in a housing pipe B. By configuring as this, ball valve A is used to regulate or shut off the flow of fluid through the pipe housing B.

However, the prior art suffered from several disadvantages. For example, ball A1 and pipe B tend to closely connect together, resulting in an unsmooth operation of ball A1 when rotating stem A2. This is because both ball A1 and pipe B are formed of plastic material as well as no interface component is provided there between. Further, microorganisms may grow at the junction of ball A1 and pipe B. This is unhealthy if the fluid is tap water. Referring to FIG. 1C, there is shown pipe B sleeved on another pipe C. In general, an adhesive D is applied on the cylindrical interface between pipes B and C. But adhesive D may incidentally process. Such adhered ball A1 and pipe C will make a regulation of the flow of fluid in the pipe C impossible.

Thus, it is desirable to provide an improved ball valve in order to overcome the above drawbacks of prior art.

SUMMARY OF THE INVENTION

It is an object of the present invention to provide a ball valve comprising a ball, a stem extended vertically from the ball, both being formed of plastic material, and a layer of metal film coated on the ball by electroplating. The coated metal film, prevents the ball from contacting a pipe housing. Further, microorganisms can not grow at the junction of the ball and pipe housing. Furthermore, in a case that the pipe housing is sleeved on another pipe by applying an adhesive that may adhere on the ball can be easily peeled off during operation. This ensures a smooth regulation of the flow of fluid in the pipe housing.

The above and other objects, features and advantages of the present invention will become apparent from the following detailed description taken with the accompanying drawings.

BRIEF DESCRIPTION OF THE DRAWINGS

FIG. 1A shows a side view in part section of a conventional ball valve mounted in a pipe housing;

FIG. 1B shows another side view in part section of the FIG. 1A ball valve and pipe housing;

FIG. 1C shows cross-sectional view showing the pipe housing of FIG. 1A adhered around another pipe by applying adhesive;

FIG. 2A shows a perspective view of the FIG. 1A ball valve;

FIG. 2B shows a perspective view of the FIG. 2A ball valve in which the ball has been coated with a layer of metal film according to the invention;

DETAILED DESCRIPTION OF THE EMBODIMENT

Referring to FIG. 2A, there is shown a conventional ball valve 1 to be employed by the invention. The ball valve A comprises a ball 12 and a stem 11 extended vertically from ball 12 both formed of plastic material. Further, both ball 12 and stem 11 are integrally formed or separately manufactured connectable components.

Referring to FIG. 2B, there is shown the FIG. 2A ball valve 1 in which ball 12 has been coated with a layer of metal film 13 by electroplating according to the invention. The metal film 13 has a higher heat resistance.

Figure 3:
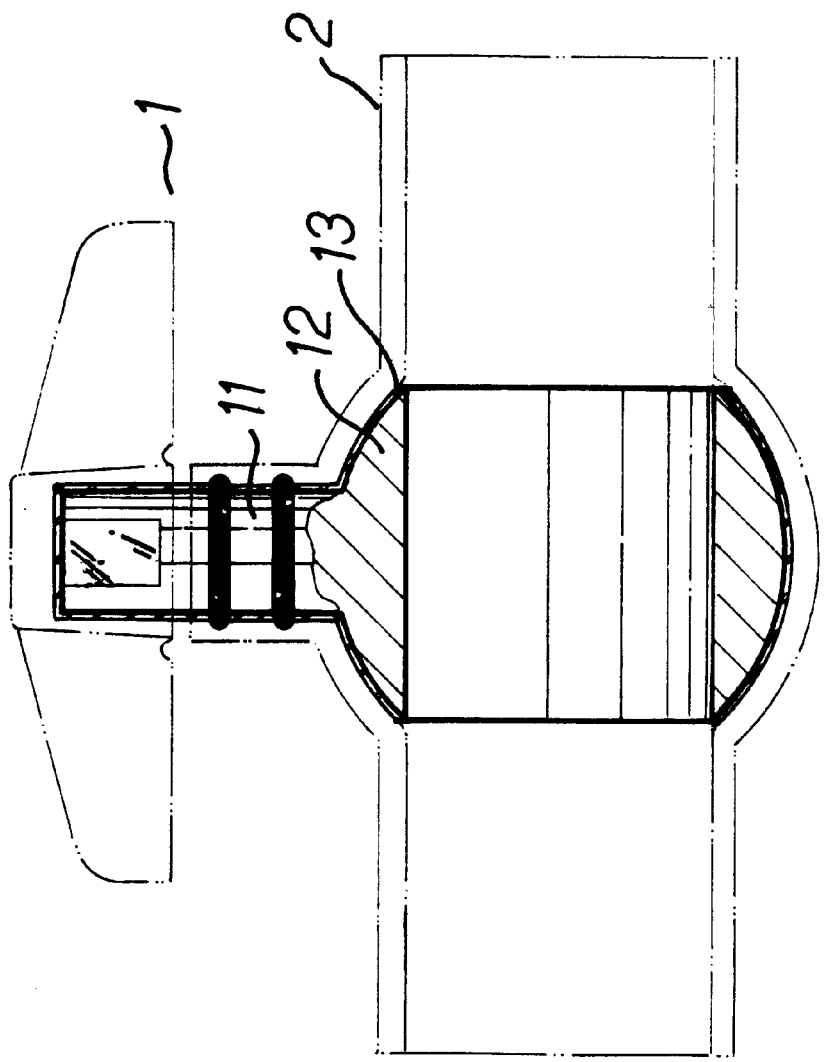
FIG. 3 shows a side view in part section of FIG. 2B ball valve mounted on in a pipe housing.

Referring to FIG. 3, the ball valve 1 has been mounted in a spherical socket of a pipe housing 2. With the coated metal film 13, it is possible of preventing ball 12 from contacting the inner surface of the spherical socket of pipe housing 2. This can ensure a smooth regulation of the flow of fluid through the pipe housing 2 when rotating stem 11. Further, microorganisms can not grow at the junction of ball 12 and pipe housing 2. This is good design if the fluid is tap water.

Figure 4:
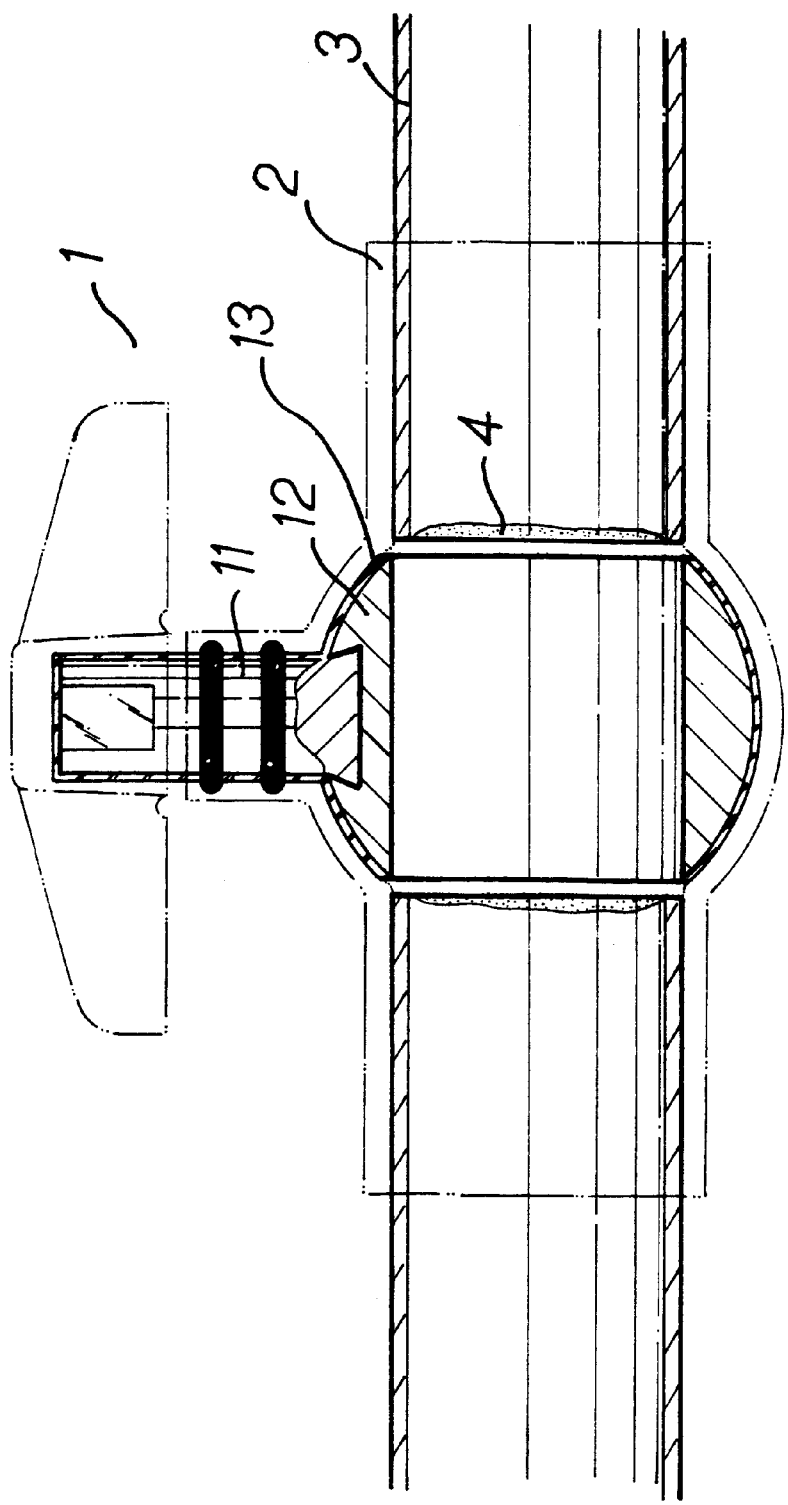
FIG. 4 shows a cross-sectional view showing the pipe housing of FIG. 3 adhered around another pipe by applying adhesive.

Referring to FIG. 4, there is shown pipe housing 2 sleeved on another pipe 3. In general, an adhesive 4 is applied on the cylindrical interface between pipe housing 2 and pipe 3. But adhesive 4 may incidentally flow inside pipe 3 to adhere on ball 12 during the installation process. With the provision of metal film 13, there is no advance influence on ball valve 1 since the adhesive 4 adhered on ball 12 can be easily peeled off during operation. This can maintain a smooth regulation fluid flow in the pipe 3.

While the invention herein disclosed has been described by means of specific embodiments, numerous modifications and variations could be made thereto by those skilled in the art without departing from the scope and spirit of the invention set forth in the claims.

What is claimed is:

1. In a ball valve formed of plastic material and defined by a ball and a stem, the ball being disposable within a spherical socket of a plastic pipe housing for controlling the flow of fluid through said pipe housing, the improvement comprising: the ball being provided with a metal film coating for preventing direct contact between an outer plastic surface of the ball and an inner plastic surface of the socket, thereby affording smooth rotation of the ball within the socket, preventing the growth of microorganisms between the ball and the pipe housing and permitting removal of any excess adhesive used to form a cylindrical interface between the pipe housing and another pipe during operation of the ball valve.

2. The ball valve of claim 1, wherein the metal film coating is provided on the ball by electroplating.

* * * * *